US012609213B2

(12) United States Patent
Sun et al.

(10) Patent No.: US 12,609,213 B2
(45) Date of Patent: Apr. 21, 2026

(54) GAS-INSULATING MEDIUM AND APPLICATION THEREOF

(71) Applicants: GUANGDONG POWER GRID CO., LTD., Guangzhou (CN); ELECTRIC POWER RESEARCH INSTITUTE OF GUANGDONG POWER GRID CO., LTD., Guangzhou (CN)

(72) Inventors: Dongwei Sun, Guangzhou (CN); Nian Tang, Guangzhou (CN); Jinpan Chen, Guangzhou (CN); Li Li, Guangzhou (CN); Junzhen Pan, Guangzhou (CN); Xiaoqing Xiao, Guangzhou (CN)

(73) Assignees: GUANGDONG POWER GRID CO., LTD., Guangzhou (CN); ELECTRIC POWER RESEARCH INSTITUTE OF GUANGDONG POWER GRID CO., LTD., Guangzhou (CN)

( * ) Notice: Subject to any disclaimer, the term of this patent is extended or adjusted under 35 U.S.C. 154(b) by 234 days.

(21) Appl. No.: 18/575,353

(22) PCT Filed: Jan. 17, 2023

(86) PCT No.: PCT/CN2023/072720
§ 371 (c)(1),
(2) Date: Dec. 29, 2023

(87) PCT Pub. No.: WO2024/119592
PCT Pub. Date: Jun. 13, 2024

(65) Prior Publication Data

US 2025/0079038 A1 Mar. 6, 2025

(30) Foreign Application Priority Data

Dec. 7, 2022 (CN) ......................... 202211576852.6

(51) Int. Cl.
*H01B 3/56* (2006.01)

(52) U.S. Cl.
CPC ..................................... *H01B 3/56* (2013.01)

(58) Field of Classification Search
CPC ........................................................ H01B 3/56
USPC .......................................................... 252/571
See application file for complete search history.

(56) References Cited

U.S. PATENT DOCUMENTS

2021/0139441 A1* 5/2021 Petrov .................... C09K 5/045
2023/0274943 A1* 8/2023 Son ..................... H01L 21/0217
438/706

FOREIGN PATENT DOCUMENTS

WO WO-2021139070 A1 * 7/2021 ........... H02B 13/055

OTHER PUBLICATIONS

Translation of WO-2021139070-A1 (Year: 2021).*
Tran Quinn "Unsaturated Fluorocarbons in the Etching Process, Environmental Benefit, Technical Hurdles." IEEE/SEMI conference 2008. (Year: 2008).*

* cited by examiner

*Primary Examiner* — Tri V Nguyen

(57) ABSTRACT

The present invention discloses a gas-insulating medium and its application. The gas-insulating medium includes the following components by mass: 8.4-76.7 parts of trans-1,1,1,4,4,4-hexafluoro-2-butene, and 23.3-91.6 parts of octafluorocyclobutane. The gas-insulating medium of the present invention has a dielectric strength better sulfur hexafluoride, and a low liquefaction temperature, and can be applied in a wider temperature range. In addition, the gas-insulating medium in certain compositions has similar properties with a single component insulating gas. when the gas leaks, the ratio of trans-1,1,1,4,4,4-hexafluoro-2-butene and octafluorocyclobutane remains unchanged, and during the maintenance of electrical equipment, trans-1,1,1,4,4,4-hexafluoro-2-butene and octafluorocyclobutane can be directly supplemented according to a certain ratio, without other operations such as analysis and detection. In addition, the gas-insulating medium of the present invention has good environmental protection performance, the GWP value is low, and the ODP value is 0.

4 Claims, No Drawings

GAS-INSULATING MEDIUM AND APPLICATION THEREOF

TECHNICAL FIELD

The present invention relates to the technical field of gas insulation of power system, in particular to a gas-insulating medium and its application.

BACKGROUND

Sulfur hexafluoride ($SF_6$) is an insulating gas widely used in China and internationally. Due to its excellent insulation and arc extinguishing properties and excellent chemical stability, it has been widely used in the power industry. However, $SF_6$ gas has an extremely high greenhouse effect, with a global warming potential (GWP) of about 23,900 times that of carbon dioxide. It is listed as one of the six greenhouse gases whose emissions are limited in the Kyoto Protocol in 1997. In recent years, global warming has intensified, and in response to climate change, countries around the world are stepping up the process of replacing greenhouse gases. The international community has signed international agreements such as the Montreal Protocol and the Kyoto Protocol, requiring signatories to gradually reduce and eventually ban sulfur hexafluoride. Therefore, finding environment-friendly and efficient alternative insulating gases and related technologies has become an urgent task in the field of China's electric power industry. At the same time, higher environmental protection requirements are put forward for the substitutes, in addition to good insulation and arc extinguishing performance, the new insulating gas should also have lowest possible GWP value and is non-toxic.

At present, in order to reduce the use of $SF_6$ in high voltage installations, it is mainly replaced with $SF_6$ mixed gas or new environment-friendly insulating gas. $SF_6$ mixed gas refers to the mixture of $SF_6$ with nitrogen and compressed air to reduce the amount of $SF_6$ used when inflating the medium and high-pressure equipment. The new environmentally friendly insulating gases mainly include perfluorocarbons, perfluoronitrile, perfluoroketone, and hydrofluoroolefin compounds, among which perfluoropentanone ($C_5F_{10}O$), perfluoroisobutyronitrile ($C_4F_7N$) and other new insulating gases have been applied to varying degrees. However, the above alternatives all have different problems: (1) the dielectric strength of $N_2$ and compressed air is low, (2) the GWP of $SF_6/N_2$ mixed gas is still very high, and (3) $C_5F_{10}O$, $C_4F_7N$ and other gases have problems such as high liquefaction temperature and certain toxicity. Therefore, it is necessary to develop new insulating gases with better overall performance.

SUMMARY

The primary object of the present invention is to overcome the shortcomings and deficiencies of the prior art and provide a gas-insulating medium. The dielectric strength of the gas-insulating medium is superior to that of sulfur hexafluoride, the liquefaction temperature is low, and the properties are similar to that of a single component insulating gas when the gas-insulating medium is in certain composition. It has low GWP value and an ODP value of 0, thus the gas-insulating medium can replace sulfur hexafluoride.

Another object of the present invention is to provide application of the above-mentioned gas-insulating medium.

The object of the present invention is realized through the following technical solution: a gas-insulating medium, comprising component 1 and component 2, the component 1 is trans-1,1,1,4,4,4-hexafluoro-2-butene, and the component 2 is octafluorocyclobutane.

In the gas-insulating medium, the component 1 (trans-1, 1,1,4,4,4-hexafluoro-2-butene) is 8.4-76.7 parts by mass, and the component 2 octafluorocyclobutane is 23.3-91.6 parts by mass. The liquefaction temperature of the gas-insulating medium with the component proportion is lower than that of individual components 1 and 2, and lower than that of perfluoropentanone, perfluoroisobutyronitrile and other gases.

Preferably, in the gas-insulating medium, the component 1, trans-1,1,1,4,4,4-hexafluoro-2-butene, is 17.1-76.7 parts by mass, and the component 2, octafluorocyclobutane, is 23.3-82.9 parts by mass. The dielectric strength of the gas-insulating medium in the component proportion is significantly better than that of sulfur hexafluoride. Moreover, the dielectric strength does not decrease significantly compared with a single component, and even the dielectric strength of the gas-insulating medium increases when the components are within a specific proportion range, while other insulating gases have significantly weaker dielectric strength compared with each of the individual component that form the insulating gases.

Preferably, in the gas-insulating medium, component 1, trans-1,1,1,4,4,4-hexafluoro-2-butene, is 17.1-56 parts by mass, and component 2, octafluorocyclobutane, is 44-82.9 parts by mass. The gas-insulating medium at this ratio also has similar properties to a single gas.

The gas-insulating medium may also comprise component 3, and component 3 is at least one selected from the group consisting of nitrogen, oxygen, air and carbon dioxide; preferably, component 1, component 2 and component 3 in said gas-insulating medium are respectively 8.4 parts-76.2 parts, 22.8 parts-90.6 parts, 1 part-30 parts, by mass.

The present disclosure also involves the application of the above-mentioned gas-insulating medium in gas-insulated switchgear, gas-insulated transformers, gas-insulated transmission lines, gas-insulated bushings, etc.

Compared with the prior art, the present invention has the following beneficial effects:

1. In the gas-insulating medium of the present invention, when the ratio of component 1 and component 2 is within a certain range, the gas-insulating medium formed has a lower liquefaction temperature than each of the component 1 and component 2, and has a lower liquefaction temperature than gases such as perfluoropentanone, perfluoroisobutyronitrile.
2. When the ratio of component 1 and component 2 in the gas-insulating medium of the present invention is within a certain range, the macroscopic properties are similar to an insulating gas having single component. When the gas-insulating medium leaks, its composition remains unchanged, and it can be directly replenished during the maintenance of electrical equipment, without other operations such as analysis and detection.
3. The gas-insulating medium of the present invention has a strong synergistic effect in terms of dielectric strength, and has significantly higher dielectric strength than the individual component 1 or component 2, and the dielectric strength is stronger than that of sulfur hexafluoride.
4. In the gas-insulating medium of the present invention, component 1 trans-1,1,1,4,4,4-hexafluoro-2-butene belongs to sulfur-free nitrogen-free hydrofluoroolefin, which has a GWP value of 18, short atmospheric life, strong dielectric strength, and is almost non-toxic; component 2 octafluorocyclobutane is a cyclofluoroolefin, whose GWP value is 9540; component 3 is a dilution gas that has low green-house effect, wherein the GWP value of nitrogen, oxygen and air is 0, and the GWP value of carbon dioxide is 1. Thereby, the GWP value of the gas-insulating medium of the present invention is much lower than the GWP value (23900) of $SF_6$, and the environmental protection performance is good. In addition, the ODP value of the gas-insulating medium is 0.

DETAILED DESCRIPTION OF THE EXAMPLES

The following will provide a clear and complete description of the technical solutions in the embodiments of the present invention, in conjunction with the embodiments of the present invention. Obviously, the described embodiments are only a part of the embodiments of the present invention, not all of them. Based on the embodiments in the present invention, all other embodiments obtained by ordinary skilled in the art without creative labor should fall within the protection scope of the present invention.

Unless otherwise noted, the scientific and technical terms used in this document are understood by those skilled in the relevant field.

The gas-insulating medium of the present invention is screened by the following process:

S1. Select the insulating gas having a liquefaction temperature range of −40 to 20° C. under standard atmospheric pressure as a component gas to obtain a variety of gas components.

S2, under the condition of a given equilibrium pressure P, obtain at least one group of T, $x_i$, $y_i$, $x_j$ and $y_j$ of a gas mixture of any two gas components i and j in a gas-liquid equilibrium state, which satisfies the following equations (1)-(14), wherein the given equilibrium pressure P is the working pressure of $SF_6$ gas, and the unit of P is MPa; T is the gas-liquid equilibrium temperature, the unit is ° C.; $x_j$ is the molar percentage of the gas component i in the liquid phase of the gas mixture; $y_j$ is the molar percentage of gas component i in the gas phase of the gas mixture, $x_j$ is the molar percentage of the gas component j in the liquid phase of the mixture, $y_j$ is the molar percentage of the gas component j in the gas phase of the gas mixture; −40° C.≤T≤20° C., $0<x_i<1$, $0<y_i<1$, $0<x_j<1$, $0<y_j<1$, and $x_i+x_j=1$, $y_i+y_j=1$. The relevant parameters of each gas component for the calculation of step S2 are shown in Table 2.

$$\phi_i^V y_i P = \phi_i^L x_i P \quad (1)$$

$$\phi_j^V y_j P = \phi_j^L x_j P \quad (2)$$

$$\ln \phi_i^L = \frac{1}{RT}\int_{V^L\to\infty}^{V^L}\left[\frac{RT}{V^L} - \left(\frac{\partial P}{\partial N_i}\right)_{T,V_i^L,N}\right]dV^L - \ln Z^L \quad (3)$$

$$\ln \phi_i^V = \frac{1}{RT}\int_{V^V\to\infty}^{V^V}\left[\frac{RT}{V^V} - \left(\frac{\partial P}{\partial N_i}\right)_{T,V^V,N}\right]dV^V - \ln Z^V \quad (4)$$

$$P = \frac{RT}{V-b} - \frac{a}{(V^2+4bV+b^2)} \quad (5)$$

-continued $$a = b\left(\frac{A_\infty^R}{-0.62323} + \sum_i x_i \frac{a_i}{b_i}\right) \quad (6)$$

$$b = \frac{RT\sum_i\sum_j \frac{1}{2}x_i x_j\left[\left(b_i - \frac{a_i}{RT}\right) + \left(b_j - \frac{a_j}{RT}\right)\right](1-k_{ij})}{RT - \left[\sum_i x_i \frac{a_i}{b_i} + \frac{A_\infty^E}{C}\right]} \quad (7)$$

$$A_\infty^E = RT\left(\left(x_i \ln\left[V_i^L(P-P_i^{sat})\right] + x_j \ln\left[V_j^L(P-P_j^{sat})\right]\right)\right) \quad (8)$$

$$a_i = 0.45724\frac{R^2T_{ci}^2}{p_{ci}}\alpha(T_{ri}) \quad (9)$$

$$\alpha(T_{ni}) = \left[1 + (0.37464 + 1.54226\omega_i - 0.26992\omega_i^2)(1 - T_{ni}^{1/2})\right]^2 \quad (10)$$

$$b_i = 0.07780\frac{RT_{ci}}{P_{ci}} \quad (11)$$

$$kij = \frac{-\frac{1}{2}\left[\sum_{k=1}^{Ngi}\sum_{l=1}^{Ngj}(\alpha_{ik}-\alpha_{jk})(\alpha_{jk}-\alpha_{jl})A_{kl}\cdot\left(\frac{298.15}{T/K}\right)^{\left(\frac{B_{kl}}{A_{kl}}-1\right)}\right] - \left(\frac{298.15}{T/K}\right)\left(\frac{\sqrt{a_i}}{b_i} - \frac{\sqrt{a_j)}}{b_j}\right)^2}{2\frac{\sqrt{a_i(T)a_j(T)}}{b_i b_j}} \quad (12)$$

$$a_i(T) = 0.45724\frac{R^2T_{ci}^2}{p_{ci}}\alpha(T) \quad (13)$$

$$\alpha(T) = \left[1 + (0.37464 + 1.54226\omega_i - 0.26992\omega_i^2)(1 - T^{1/2})\right]^2 \quad (14)$$

In above equations, $$\phi_i^V$$

is the gas phase fugacity of gas component i in the gas mixture;

$$\phi_i^L$$

is the liquid phase fugacity of gas component i in the gas mixture;

$$\phi_j^V$$

is the gas phase fugacity of gas component j in the gas mixture;

$$\phi_j^L$$

is the liquid phase fugacity of gas component j in the gas mixture;

R is the gas constant;

$Z^L$ is the gas phase compressibility factor of the gas mixture, $$Z^L = \frac{PV^L}{RT};$$

$Z^V$ is the liquid phase compressibility factor of the gas mixture, $$Z^V = \frac{PV^V}{RT};$$

$V^L$ is the liquid phase molar volume of the gas mixture, in $m^3$;

$V^V$ is the gas phase molar volume of the gas mixture, in $m^3$;

V is the volume of the gas mixture under P and T conditions, in a unit of $m^3$;

$N_i$ is the molar amount of the gas component i in the gas mixture, in mol;

N is the total molar amount of the gas mixture, in mol;

a and b are the state equation parameters of the gas mixture, respectively;

$a_i$ is the molecular energy constant of gas component i;

$b_i$ is the volume correction constant of gas component i;

$\omega_i$ is the eccentricity factor of gas component i;

$T_{ri}$ is the correspondence state temperature of gas component i;

$T_{ci}$ is the critical temperature of gas component i, the unit is K;

$P_{ci}$ is the critical pressure of gas component i, and the unit is MPa;

$k_{ij}$ is the binary interaction parameter, $k_{ij} \geq 2$;

$$P_i^{sat}$$

is the saturated vapor pressure of gas component i at temperature T, in MPa;

$$P_j^{sat}$$

is the saturated vapor pressure of gas component j at temperature T, in MPa;

$$A_\infty^E$$

is the free energy of the gas mixture;

$$V_i^L$$

is the liquid phase volume of gas component i, in $m^3$;

$$V_j^L$$

is the liquid phase volume of gas component), in $m^3$;

T/K is the equilibrium temperature converted to Kelvin;

$N_{gi}$; is the number of functional groups separated by the molecules of gas component i;

$N_{gj}$ is the number of functional groups separated by the molecules of gas component j;

k represents any one of the functional groups separated from the gas component i;

l represents any one of the functional groups separated from gas component j;

$a_{ik}$ is the relative molar fraction of the functional group k of gas component i, obtained by dividing the number of the functional group by the total number of functional groups in the molecule of gas component i;

$a_{jl}$ is the relative molar fraction of the functional group I of gas component j, obtained by dividing the number of the functional group by the total number of functional groups in the molecule of gas component j;

$A_{kl}$ and $B_{kl}$ are the functional group parameters of k and 1;

S3. Based on the calculation results of S2, under the given equilibrium pressure P, screen for the gas mixtures, which satisfy that the equilibrium temperature T is the minimum equilibrium temperature, and the minimum equilibrium temperature is lower than the liquefaction temperature of each gas component in the gas mixtures when $x_i=y_1$.

Following steps S1-S3 above, the present invention screens for component 1 and component 2 that meet the requirements, and the existing gases such as hydrofluoroalkenes, hydrofluoroalkanes, alkanes, perfluorocarbons, perfluorinated nitriles, and perfluorones are screened.

The calculation results of the liquefaction temperature of some of the gases among hydrofluoroalkenes, hydrofluoroalkanes, alkanes, perfluorocarbons, perfluoronitrile, and perfluorone are shown in Table 1 (the gases listed in Table 1 are some of the gases selected for the initial screening of the present invention, which do not limit the screening range of the present invention). Among them, the liquefaction temperature of difluoromethane exceeds the temperature range of −40-20° C. and is not within the screening range. A total of 13 gases are screened in step S1: octafluorocyclobutane (A), 3,3,3-trifluoroethylene (B), trans-1-3,3,3-tetrafluoropropylene (C), 2,3,3,3-tetrafluoropropylene (D), trans-1-chloro-3,3,3-trifluoropropylene (E), cis-1,3,3,3-tetrafluoropropylene (F), 1,1,1,2-tetrafluoroethane (H), heptafluoroisobutyronitrile (I), 1,1,1,2,3,3,3-heptafluoropropane (J), propane (K), trans-1,1,1,4,4,4-hexafluoro-2-butanene (L), cis 1,1,1,4,4,4-hexafluoro-2-butene (M).

The relevant parameters of each gas component screened through step S1 are shown in Table 2.

TABLE 1

Screened gases through S1

| Gas | No. | Liquefaction temperature /° C. |
|---|---|---|
| octafluorocyclobutane | A | −5.9 |
| 3,3,3-trifluoroethylene | B | −25.4 |
| trans-1,-3,3,3-tetrafluoropropylene | C | 18.3 |
| 2,3,3,3-tetrafluoropropylene | D | −29 |
| trans-1-chloro-3,3,3-trifluoropropylene | E | 13.6 |
| cis-1,3,3,3-tetrafluoropropylene | F | 9.7 |
| Difluoromethane | G | −51 |
| 1,1,1,2-tetrafluoroethane | H | −26 |
| heptafluoroisobutyronitrile | I | −4.7 |
| 1,1,1,2,3,3,3-heptafluoropropane | J | −16.1 |
| propane | K | −39 |
| trans-1,1,1,4,4,4-hexafluoro-2-butene | L | 7.5 |
| cis-1,1,1,4,4,4-hexafluoro-2-butene | M | 33.4 |

TABLE 2

Parameters of each component gas screened in S1

| Parameters | A | B | C | D | E | F | H | I | J | K | L | M |
|---|---|---|---|---|---|---|---|---|---|---|---|---|
| $\omega_i$ | 0.353 | 0.260 | 0.313 | 0.276 | 0.302 | 0.382 | 0.328 | 0.331 | 0.352 | 0.151 | 0.405 | 0.386 |
| $T_{ci}$/K | 388.38 | 376.93 | 382.51 | 367.85 | 439.6 | 423.23 | 374.21 | 401.25 | 374.9 | 369.89 | 403.37 | 444.5 |
| $p_{ci}$/MPa | 2.7775 | 3.5179 | 3.6449 | 3.3822 | 3.623 | 3.5036 | 4.059 | 3.253 | 2.925 | 4.251 | 2.7664 | 2.903 |
| Dielectric Strength | 1.31 | 0.81 | 0.83 | 0.75 | 1.21 | 0.85 | 0.65 | 2.21 | 1.14 | 0.65 | 1.61 | 1.55 |

Among the 13 component gases, the above steps S2 and S3 were used to screen in MATLAB software the gas mixtures of two gas components. During the process, P was taken as Pβ0.1 MPa (in other specific schemes, P can be taken based on the working pressure of an insulating gas, and 0.1 MPa is selected as an example to explain the present disclosure in detail; the common working pressure of the insulating gas mixtures in the present invention is 0.1 MPa to 0.5 MPa); The screening results are shown in Table 3.

The results obtained through the screening of steps S2 and S3 are two gas mixtures: octafluorocyclobutane+trans-1,1,1,4,4,4-hexafluoro-2-butene, and octafluorocyclobutane+heptafluoroisobutyronitrile.

TABLE 3

Calculation results of screening gas mixtures in steps S2 and S3 under 0.1 Mpa

| Gas mixtures | kij | Satisfying S3 screening conditions | $x_i$ | Lowest liquefaction/° C. |
|---|---|---|---|---|
| octafluorocyclobutane + 3,3,3-trifluoroethylene | 0.04 | No | NA | NA |
| octafluorocyclobutane + 2,3,3,3-etrafluoropropylene | 0.1 | No | NA | NA |
| octafluorocyclobutane + trans-1,1,1,4,4,4-hexafluoro-2-butene | 0.26 | Yes | 0.74 | −7.5 |
| octafluorocyclobutane + cis-1,3,3,3-tetrafluoropropylene | 0.15 | No | NA | NA |
| octafluorocyclobutane + 1,1,1,2-tetrafluoroethane | 0.08 | No | NA | NA |
| octafluorocyclobutane + heptafluoroisobutyronitrile | 0.28 | No | NA | NA |

$x_i$ in Table 3 is the molar fraction of the gas component octafluorocyclobutane.

To satisfy the application scenarios with higher dielectric strength, a further optimized solution is to screen a gas mixture with dielectric strength greater than or equal to 1 as a substitute gas for $SF_6$ gas, through S4.

S4. Selecting a gas mixture with dielectric strength greater than or equal to 1 as a substitute gas for $SF_6$ gas from the gas mixtures selected in S3; dielectric strength of a gas mixture is $E=E_i x_i+E_1 x_1$. In this equation, $E_i$ is the dielectric strength of gas component i, $E_j$ is the dielectric strength of gas component j, $x_i$ and $x_j$ are the corresponding value from the screening conditions in step S3.

Based on the above example, the dielectric strength of a mixture of octafluorocyclobutane and trans-1,1,1,4,4,4-hexafluoro-2-butene and a gas mixture of octafluorocyclobutane and heptafluoroisobutyronitrile were further calculated using the method described in S4. The calculation results are shown in Table 4.

Through calculation and experimental methods, the present disclosure has obtained a gas mixture of trans-1,1,1,4,4,4-hexafluoro-2-butene and octafluorocyclobutane. The results of experimental and simulation calculations show that this gas mixture has a dual synergistic effect in both reducing the liquefaction temperature and providing insulation performance, specifically as follows:

(1) The dielectric strength of the gas mixture is better than either octafluorocyclobutane ($c\text{-}C_4F_8$) or trans-1,1,1,4,4,4-hexafluoro-2-butene, and better than sulfur hexafluoride.

(2) When the ratio of trans-1,1,1,4,4,4-hexafluoro-2-butene to octafluorocyclobutane is within a certain range, the gas mixture as an gas-insulating medium has a lower liquefaction temperature and dielectric strength compared to any one of octafluorocyclobutane ($c\text{-}C_4F_8$) and trans-1,1,1,4,4,4-hexafluoro-2-butene, and the gas mixture has a lower liquefaction temperature compared to gas alternatives such as octafluorocyclobutane ($c\text{-}C_4F_8$), perfluoropenone ($C_5F_{10}O$), and perfluoroisobutyronitrile.

(3) When the ratio of trans-1,1,1,4,4,4-hexafluoro-2-butene to octafluorocyclobutane is within a certain range, the gas mixture can be macroscopically considered as a single gas. When gas leak occurs, the composition remains unchanged. During electrical equipment maintenance, the gas can be directly replenished without the need for analysis, testing, or other operations.

EXAMPLE 1

8.4 parts by mass of trans-1,1,1,4,4,4-hexafluoro-2-butene and 91.6 parts by mass of octafluorocyclobutane were physically mixed in liquid state to obtain a gas-insulating medium after complete gasification.

EXAMPLE 2

17.1 parts by mass of trans-1,1,1,4,4,4-hexafluoro-2-butene and 82.9 parts by mass of octafluorocyclobutane were physically mixed under liquid phase condition to obtain a gas-insulating medium after complete gasification.

EXAMPLE 3

26.1 parts by mass of trans-1,1,1,4,4,4-hexafluoro-2-butene and 73.9 parts by mass of octafluorocyclobutane were physically mixed under liquid phase condition to obtain a gas-insulating medium after complete gasification.

EXAMPLE 4

35.4 parts by mass of trans-1,1,1,4,4,4-hexafluoro-2-butene and 64.6 parts by mass of octafluorocyclobutane were physically mixed under liquid phase condition to obtain a gas-insulating medium after complete gasification.

EXAMPLE 5

55.5 parts by mass of trans-1,1,1,4,4,4-hexafluoro-2-butene and 44.5 parts by mass of octafluorocyclobutane were physically mixed under liquid phase condition to obtain a gas-insulating medium after complete gasification.

EXAMPLE 6

76.7 parts by mass of trans-1,1,1,4,4,4-hexafluoro-2-butene and 23.3 parts by mass of octafluorocyclobutane were physically mixed under liquid phase condition to obtain a gas-insulating medium after complete gasification.

EXAMPLE 7

88.1 parts by mass of trans-1,1,1,4,4,4-hexafluoro-2-butene and 11.9 parts by mass of octafluorocyclobutane were physically mixed under liquid phase condition to obtain a gas-insulating medium after complete gasification.

EXAMPLE 8

8.4 parts by mass of trans-1,1,1,4,4,4-hexafluoro-2-butene and 90.6 parts by mass of octafluorocyclobutane were physically mixed under liquid phase condition. After complete gasification, 1 part by mass of carbon dioxide was added to obtain a gas-insulating medium.

EXAMPLE 9

76.2 parts by mass of trans-1,1,1,4,4,4-hexafluoro-2-butene and 22.8 parts by mass of octafluorocyclobutane were physically mixed under liquid phase condition. After complete gasification, 1 part by mass of carbon dioxide was added to obtain a gas-insulating medium.

EXAMPLE 10

18.4 parts by mass of trans-1,1,1,4,4,4-hexafluoro-2-butene and 51.6 parts by mass of octafluorocyclobutane were physically mixed under liquid phase condition. After complete gasification, 30 parts by mass of nitrogen was added to obtain a gas-insulating medium.

EXAMPLE 11

18.4 parts by mass of trans-1,1,1,4,4,4-hexafluoro-2-butene and 51.6 parts by mass of octafluorocyclobutane were physically mixed under liquid phase condition. After complete gasification, 30 parts by mass of oxygen was added to obtain a gas-insulating medium.

EXAMPLE 12

18.4 parts by mass of trans-1,1,1,4,4,4-hexafluoro-2-butene and 51.6 parts by mass of octafluorocyclobutane were physically mixed under liquid phase condition. After complete gasification, 30 parts by mass of air was added to obtain a gas-insulating medium.

COMPARATIVE EXAMPLE 1

100 parts by mass of trans-1,1,4,4,4-hexafluoro-2-butene was taken as a gas-insulating medium.

COMPARATIVE EXAMPLE 2

100 parts by mass of octafluorocyclobutane were taken as a gas-insulating medium.

COMPARATIVE EXAMPLE 3

100 parts by mass of perfluoroapentanone ($C_5F_{10}O$) were taken as a gas-insulating medium.

COMPARATIVE EXAMPLE 4

100 parts by mass of perfluoroisobutyronitrile were taken as a gas-insulating medium.

COMPARATIVE EXAMPLE 5

100 parts by mass of sulfur hexafluoride were taken as a gas-insulating medium.

Performance Testing

1. Fill the gas-insulating medium into the power equipment, and test the dielectric strength of Examples 1-12 and the Comparative Examples 1-5 under the conditions of a pole spacing of 0.1 inches and a pressure of 1 standard atmospheric pressure at 25° C. Calculate the multiples of the dielectric strength of the gas-insulating medium of Examples 1-12 and Comparative Examples 1-5 relative to SF6, trans-1,1,1,4,4,4-hexafluoro-2-butene and octafluorocyclobutane, respectively. The test results are shown in Table 4.

2. Under standard atmospheric pressure, measure the liquefaction temperature of the gas-insulating medium of Examples 1-14 and Comparative Examples 1-5 with a phase equilibrium measuring instrument (model VLE100). The test results are shown in Table 5.

3. Test the GWP value of gas-insulating medium of Examples 1-12 and Comparative Examples 1-5, with $CO_2$ as the reference value of 1.0 (100 years). The test results are shown in Table 5.

4. Under standard atmospheric pressure, measure the gas phase mass fraction and liquid phase mass fraction of partially liquefied gas-insulating medium in Examples 1-7 at 10° C. and 0° C. with a phase equilibrium measuring instrument (model VLE100). The test results are shown in Table 6.

TABLE 4

| Test item | Multiple of the dielectric strength relative to $SF_6$ | Multiple of the dielectric strength relative to trans-1,1,1,4,4,4-hexafluoro-2-butene | Multiple of the dielectric strength relative to octafluorocyclobutane |
|---|---|---|---|
| Example 1 | 1.45 | 0.91 | 1.12 |
| Example 2 | 1.91 | 1.19 | 1.47 |
| Example 3 | 1.99 | 1.24 | 1.53 |
| Example 4 | 2.06 | 1.29 | 1.58 |
| Example 5 | 2.13 | 1.33 | 1.64 |
| Example 6 | 1.89 | 1.18 | 1.45 |
| Example 7 | 1.83 | 1.14 | 1.41 |
| Example 8 | 1.40 | 0.88 | 1.08 |
| Example 9 | 1.64 | 1.03 | 1.26 |
| Example 10 | 1.30 | 0.81 | 1.00 |
| Example 11 | 1.30 | 0.81 | 1.00 |
| Example 12 | 1.30 | 0.81 | 1.00 |
| Comparative Example 1 | 1.60 | 1.00 | 1.23 |
| Comparative Example 2 | 1.30 | 0.81 | 1.00 |

TABLE 4-continued

| Test item | Multiple of the dielectric strength relative to $SF_6$ | Multiple of the dielectric strength relative to trans-1,1,1,4,4,4-hexa-fluoro-2-butene | Multiple of the dielectric strength relative to octafluorocyclo-butane |
|---|---|---|---|
| Comparative Example 3 | 2.0 | 1.25 | 1.54 |
| Comparative Example 4 | 2.2 | 1.38 | 1.69 |
| Comparative Example 5 | 1 | 0.63 | 0.77 |

TABLE 5

| Test item | GWP (Global warming potential) | Liquefaction temperature/° C. |
|---|---|---|
| Example 1 | 8582 | −6.9 |
| Example 2 | 7625 | −7.2 |
| Example 3 | 6672 | −7.2 |
| Example 4 | 5724 | −7.0 |
| Example 5 | 3793 | −7.1 |
| Example 6 | 1914 | −6.9 |
| Example 7 | 886 | −1.5 |
| Example 8 | 7895 | −42 |
| Example 9 | 2831 | −48 |
| Example 10 | 5057 | −48 |
| Example 11 | 5057 | −48 |
| Example 12 | 5057 | −48 |
| Comparative Example 1 | 18 | 7.5 |
| Comparative Example 2 | 9540 | −6.5 |
| Comparative Example 3 | 10 | 26.9 |
| Comparative Example 4 | 2100 | −4.7 |
| Comparative Example 5 | 23900 | −49.6 |

TABLE 6

| | 0° C., gas phase mass fraction (of trans-1,1,1,4,4,4-hexa-fluoro-2-butene/%) | 0° C., liquid phase mass fraction (of trans-1,1,1,4,4,4-hexa-fluoro-2-butene/%) | 10° C., gas phase mass fraction (of trans-1,1,1,4,4,4-hexa-fluoro-2-butene/%) | 10° C., liquid phase mass fraction (of trans-1,1,1,4,4,4-hexa-fluoro-2-butene/%) |
|---|---|---|---|---|
| Example 1 | 7.9 | 11.2 | 8.2 | 12.8 |
| Example 2 | 16.9 | 17.2 | 17.0 | 17.2 |
| Example 3 | 26.0 | 26.1 | 26.0 | 26.1 |
| Example 4 | 33.1 | 33.2 | 35.2 | 35.3 |
| Example 5 | 55.1 | 55.3 | 56.4 | 56.8 |
| Example 6 | 88.3 | 76.7 | 85.9 | 70.4 |
| Example 7 | 92.6 | 86.4 | 93.2 | 87.5 |

As can be seen in Table 4, the dielectric strength of all the gas-insulating mediums are significantly better than that of sulfur hexafluoride, and the dielectric strength are not significantly reduced compared with that of single component trans-1,1,1,4,4,4-hexafluoro-2-butene and octafluorocyclobutane, and even the dielectric strength of the gas-insulating mediums are improved when the component ratio is in a specific range, while the dielectric strength of other insulating gases decreases significantly after their combination.

Table 5 compares the liquefaction temperature of the gas-insulating medium of the above Examples 1-12 and the Comparative Examples 1-5, and it can be seen that when the mass ratio of octafluorocyclobutane (c-$C_4F_8$) and trans-1,1,1,4,4,4-hexafluoro-2-butene is (17.1-76.7):(23.3-82.9), the liquefaction temperature of the gas-insulating medium of the present invention is lower than that of octafluorocyclobutane (c-$C_4F_8$), trans-1,1,1,4,4,4-hexafluoro-2-butene, perfluoropentanone ($C_5F_{10}O$) and perfluoroisobutyronitrile, which can be applied in a wider temperature range.

The GWP value of the Examples and Comparative Examples in Table 5 indicates that the gas-insulating medium of present invention is much lower than that of sulfur hexafluoride and can better satisfy the current environmental protection requirement of reducing the effect of global warming.

Table 6 compares the changes of gas phase composition and liquid phase composition of the gas-insulating medium in the above Examples 1-7 after partial liquefaction. With regards to Examples 2, 3, 4, 5, after the liquefaction, trans-1,1,1,4,4,4-hexafluoro-2-butene and octafluorocyclobutane have almost the same mass fraction in both the gas phase and liquid phase, and the composition of the gas mixture does not change after partial liquefaction, which is similar to a pure gas, and macroscopically can be regarded as a single gas.

Finally, it should be noted that the above embodiments are only used to illustrate the technical solution of the present invention, not to limit the protection scope of the present invention. Although the present invention is described in detail with reference to the preferred embodiments, those skilled in the art should understand that the technical solution of the present invention may be modified or equivalently replaced, without departing from the substance and scope of the technical solution of the present invention.

The invention claimed is:

1. A gas-insulating medium, consisting of component 1 and component 2, wherein the component 1 is trans-1,1,1,4,4,4-hexafluoro-2-butene, and the component 2 is octafluorocyclobutane;

the trans-1,1,1,4,4,4-hexafluoro-2-butene is 8.4-76.7 parts by mass, and the octafluorocyclobutane is 23.3-91.6 parts by mass.

2. The gas-insulating medium of claim 1, wherein in the gas-insulating medium, the trans-1,1,1,4,4,4-hexafluoro-2-butene is 17.1-76.7 by mass, and the parts octafluorocyclobutane is 23.3-82.9 parts by mass.

3. The gas-insulating medium of claim 2, wherein in the gas-insulating medium, the trans-1,1,1,4,4,4-hexafluoro-2-butene is 17.1-56 parts by mass, and the octafluorocyclobutane of component 2 is 44-82.9 parts by mass.

4. A gas-insulating medium, consisting of component 1, component 2, and component 3, wherein the component 1 is trans-1,1,1,4,4,4-hexafluoro-2-butene, the component 2 is octafluorocyclobutane, and the component 3 is at least one selected from the group consisting of nitrogen, oxygen, air and carbon dioxide; and wherein the component 1, the component 2 and the component 3 in the gas-insulating medium are respectively 8.4-76.2 parts, 22.8 parts-90.6 parts, and 1 part-30 parts by mass.

* * * * *